(12) United States Patent
Yao et al.

(10) Patent No.: US 8,152,722 B2
(45) Date of Patent: Apr. 10, 2012

(54) METHOD AND APPARATUS FOR QUICKLY DETERMINING AN IMAGING REGION IN AN ULTRASONIC IMAGING SYSTEM

(75) Inventors: Bin Yao, Shenzhen (CN); Qinjun Hu, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 811 days.

(21) Appl. No.: 12/275,005

(22) Filed: Nov. 20, 2008

(65) Prior Publication Data

US 2009/0131794 A1  May 21, 2009

(30) Foreign Application Priority Data

Nov. 20, 2007 (CN) .......................... 2007 1 0186879

(51) Int. Cl.
*A61B 8/00* (2006.01)
(52) U.S. Cl. .......................... 600/437; 600/443; 382/128
(58) Field of Classification Search .......... 600/437–466; 382/128–132
See application file for complete search history.

(56) References Cited

U.S. PATENT DOCUMENTS

| | | | | |
|---|---|---|---|---|
| 4,387,365 A * | 6/1983 | Berry et al. | ................... | 708/442 |
| 4,468,747 A | 8/1984 | Leavitt et al. | | |
| 4,471,449 A | 9/1984 | Leavitt et al. | | |
| 5,197,037 A | 3/1993 | Leavitt | | |
| 5,546,807 A * | 8/1996 | Oxaal et al. | ..................... | 73/606 |
| 5,797,396 A * | 8/1998 | Geiser et al. | ................... | 600/407 |
| 6,647,135 B2 * | 11/2003 | Bonnefous | .................... | 382/128 |
| 7,248,725 B2 | 7/2007 | Zwirn et al. | | |
| 7,959,572 B2 * | 6/2011 | Ishihara | ........................ | 600/437 |
| 2006/0235301 A1 * | 10/2006 | Chalana et al. | .............. | 600/443 |
| 2006/0235302 A1 * | 10/2006 | Grossman et al. | ............ | 600/443 |
| 2007/0276254 A1 * | 11/2007 | Yang et al. | ..................... | 600/463 |
| 2008/0109168 A1 * | 5/2008 | Koren et al. | ..................... | 702/16 |
| 2008/0171939 A1 * | 7/2008 | Ishihara | ........................ | 600/449 |
| 2008/0181479 A1 * | 7/2008 | Yang et al. | ..................... | 382/131 |
| 2008/0242985 A1 * | 10/2008 | Chalana et al. | ............... | 600/443 |
| 2008/0249414 A1 * | 10/2008 | Yang et al. | ..................... | 600/445 |
| 2009/0131794 A1 * | 5/2009 | Yao et al. | ....................... | 600/443 |
| 2010/0113930 A1 * | 5/2010 | Miyachi | ........................ | 600/443 |
| 2010/0117993 A1 * | 5/2010 | Kent | ............................... | 345/177 |
| 2011/0125017 A1 * | 5/2011 | Ramamurthy et al. | ........ | 600/443 |

FOREIGN PATENT DOCUMENTS

| | | |
|---|---|---|
| CN | 1742682 A | 3/2006 |
| JP | 2004057823 | 2/2004 |

* cited by examiner

*Primary Examiner* — Sanjay Cattungal
(74) *Attorney, Agent, or Firm* — Kory D. Christensen; Stoel Rives LLP

(57) ABSTRACT

A method and apparatus for quickly determining an imaging region associated with the current transmission in an ultrasonic imaging system includes determining a profile of the imaging region to be processed and, in turn, boundaries of that imaging region according to characteristics of the current transmitted sound field and the demand of the imaging mode. The method also includes computing a set of rectangular coordinates of points on the imaging region to be processed according to the determined boundaries.

13 Claims, 7 Drawing Sheets

METHOD AND APPARATUS FOR QUICKLY DETERMINING AN IMAGING REGION IN AN ULTRASONIC IMAGING SYSTEM

CROSS-REFERENCE TO RELATED APPLICATIONS

This application claims priority to Chinese Patent Application No. 200710186879.3, filed on Nov. 20, 2007, for "Method and Apparatus for Quickly Determining an Imaging Region in an Ultrasonic Imaging System," the disclosure of which is fully incorporated herein by reference.

TECHNICAL FIELD

This disclosure relates to ultrasonic imaging and, in particular, to a method for quickly determining an imaging region in an ultrasonic imaging system and an apparatus for implementing such a method.

BRIEF SUMMARY

A method and apparatus for quickly determining an imaging region associated with a current transmission in an ultrasonic imaging system is disclosed.

DETAILED DESCRIPTION

In conventional ultrasonic imaging systems, an ultrasonic image is generated through multiple transmissions/receptions. For a single beam system, one scan line can be obtained by each transmission after multiple array elements receive multichannel data that go through beam formation, which corresponds to one line in the whole imaging region. Generally, the scan line is expressed in a polar format, i.e., an angle and a depth. Several scan lines resulting from multiple transmissions/receptions will uniformly cover the whole imaging region.

Although the scan data are obtained in a polar format, display monitors typically require raster (i.e., rectangular) data. Thus, digital ultrasonic systems generally include a digital scan conversion (DSC) module. Within the DSC module, the rectangular coordinates of a certain point on the image to be displayed on the monitor are converted into polar coordinates. By performing an interpolation based on several scan points close to that point in the polar coordinate system, it is possible to obtain the ultrasonic information at that point in the rectangular coordinate system. Coordinate conversion and interpolation are continued until the rectangular coordinates include all of the information from the ultrasonic image. Conventionally, DSC is performed after detection and compression. Data resulting from the coordinate conversion and interpolation may be directly displayed.

Conventional ultrasonic systems obtain ultrasonic data in the rectangular coordinate system by performing the coordinate conversion and interpolation point by point, and are thereby independent of the current scanning. That is, such systems need to store all the scan line data in a buffer. Again, the DSC in conventional ultrasonic systems is a module for conversion between rectangular coordinates suitable for displaying the image and polar coordinates of the scan line data, and a subsequent interpolation algorithm. Generally, the DSC module is an independent, only processing one frame of an image saved in the memory, independent of previous processing.

Figure 2:
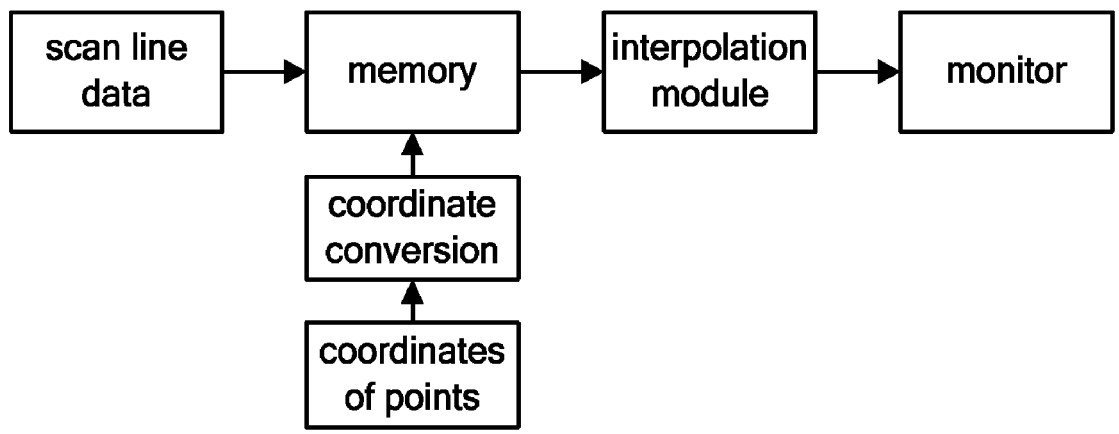
FIG. 2 is flow diagram of a conventional process of digital scan conversion (DSC)

As shown in FIG. 2, the memory stores scan line data of one image frame. On the one hand, the scan line data saved in the memory are updated with the processed scan line data according to their corresponding positions. On the other hand, the rectangular coordinates of the points on a displayed image are converted into polar coordinates, and the ultrasonic information of the points can be obtained through interpolation, thereby updating the displayed image. As the updating of the displayed image is performed point by point in sequences, the memory is required to store scan line data concerning at least one complete frame of image.

As explained above, prior methods are performed point by point, and the point being currently updated is independent of the position of the current transmission/reception. In other words, the order of updating the points of the displayed image is independent of the order of updating the ultrasonic frame data. As a result, the digital scan conversion step does not perfectly combine with the previous processing procedures. Furthermore, the images formed do not necessarily represent the most updated data.

Figure 1:
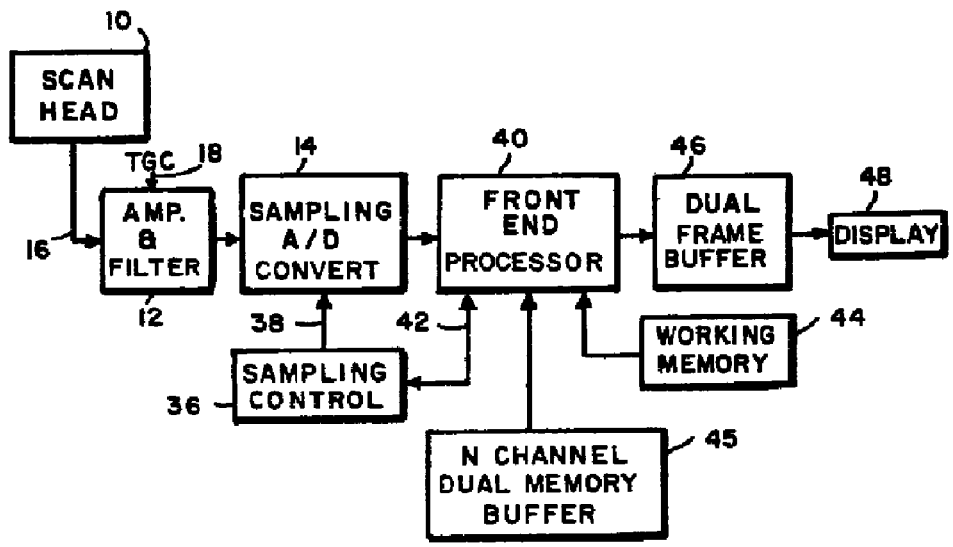
FIG. 1 is a schematic diagram of a conventional ultrasonic imaging system.

U.S. Pat. No. 5,197,037 discloses a method for performing a DSC and a beam formation as a single operation using the steps shown in FIG. 1. The signal processing is performed by an analog circuit, and the beam formation and DSC are performed by a front-end processor. The beams are directly synthesized to obtain data at various positions in the rectangular coordinate system. This technique actually is still related to the single beam system. The beam formation for each transmission targets the rectangular coordinate portion of the single beam. Assuming the beam projects at an angle θ with an included angle of α degrees between the scan lines at a distance, then the image in the rectangular coordinate corresponding to the portion [θ−α/2, θ+α/2] is subjected to direct beam formation. The beam formation is still determined based on the range of the included angle between the scan lines at a distance near a scan line.

In view of the defects in prior systems, the present disclosure provides a method and apparatus for quickly determining an imaging region for each transmission in an ultrasonic imaging system. By determining the imaging region for each transmission, it is possible to swiftly obtain the range of the imaging region in the rectangular coordinate system and, in turn, set of rectangular coordinates of the points on the displayed image to be processed, such that the updating of the resultant image is associated with the current transmission.

According to a first aspect of the present disclosure, there is provided a method for quickly determining an imaging region in an ultrasonic imaging system. In one embodiment, the method includes transmitting ultrasound energy into an insonified region in a current scan plane, thereby forming a transmitted sound field, and receiving ultrasound echo return signals from the insonified region. The method may also include determining a range of a resultant image covered by the transmitted sound field based on energy lines of the transmitted sound field that have energy equal to a threshold. In one embodiment, the method further includes determining boundaries in a depth direction of the imaging region to be processed within said range according to characteristics of an imaging mode, said boundaries being determined as a function of the threshold and intensity values of echo signals from insonified points in the current scan plane, said boundaries thereby being variable according to each current scan plane. The method may also include geometrically converting for display, and displaying, for a selected depth, a representation of the intensity values originating only between the boundaries.

According to a second aspect of the present disclosure, a method includes determining a range of a resultant image covered by a transmitted sound field based on energy lines of the transmitted sound field that have energy equal to a threshold. The method may also include determining boundaries in a depth direction of the imaging region to be processed within the range according to characteristics of the imaging mode. The method may also include determining formulae $F1(x,y)=0$ and $F2(x,y)=0$ of the boundaries in rectangular coordinate system according to angles of the boundaries with respect to the depth direction and polar coordinates of random points on the boundaries, where $x=r*\sin(\theta)$ and $y=r*\cos(\theta)$; and where, whether a point $P(x,y)$ on the resultant image is located in the imaging region to be processed is determined according to the following conditions: if $F1(x,y)*F2(x,y)<=0$, the point $P(x,y)$ is in the imaging region to be processed; and if $F1(x,y)*F2(x,y)>0$, the point $P(x,y)$ is out of the imaging region to be processed.

The method according to the present disclosure may further include computing in real time set of rectangular coordinates of all of the points on the imaging region to be processed according to the formulae $F1(x,y)=0$ and $F2(x,y)=0$ of the boundaries in the depth direction of the imaging region to be processed in the rectangular coordinate system, where x and y are integers.

In one embodiment, a lookup table is configured to store a set of rectangular coordinates of all of the points on the imaging region to be processed, which are computed according to the formulae $F1(x,y)=0$ and $F2(x,y)=0$ of the boundaries in the depth direction of the imaging region to be processed in the rectangular coordinate system, where x and y are integers.

In various embodiments, the image region to be processed is sector-shaped or rectangular.

According to a third aspect of the present disclosure, there is provided a method for quickly determining an imaging region in an ultrasonic imaging system including determining a range of a resultant image covered by a transmitted sound field based on energy lines of the transmitted sound field that have energy equal to a threshold; and by considering the energy lines of the transmitted sound field having energy equal to the threshold as boundaries in a depth direction of the imaging region to be processed, determining in the depth direction in a point-by-point manner a rectangular coordinate pair of $P1(x,y)$ and $P2(x,y)$ of corresponding points at the same depth on respective boundaries, where the points with the sound field energy larger than the threshold are within the imaging region to be processed.

The method according to the third aspect of the present disclosure may further include configuring a lookup table to store the rectangular coordinate pairs of $P1(x,y)$ and $P2(x,y)$ of corresponding points at the same depth on the respective boundaries.

The method according to the second aspect of the present disclosure may also include, after looking up from the lookup table the rectangular coordinate pairs of $P1(x,y)$ and $P2(x,y)$ of corresponding points at the same depth on the respective boundaries, determining set of rectangular coordinates of all of the points on the imaging region to be processed, where x and y are integers.

In one embodiment, the shape of the imaging region to be processed is such that it is narrow in focusing region, but wide in near and far fields.

According to a fourth aspect of the present disclosure, there is provided an apparatus for quickly determining an imaging region in an ultrasonic imaging system. The apparatus may include a unit for determining a range of a resultant image covered by a transmitted sound field based on energy lines of the transmitted sound field that have energy equal to a threshold. The apparatus may further include a unit for determining boundaries in a depth direction of the imaging region to be processed within said range according to characteristics of the imaging mode. The apparatus may include a unit for determining formulae $F1(x,y)=0$ and $F2(x,y)=0$ of the boundaries in rectangular coordinate system according to angles of the boundaries with respect to the depth direction and polar coordinates of random points on the boundaries, where $x=r*\sin(\theta)$ and $y=r*\cos(\theta)$; and where, whether a point $P(x,y)$ on the resultant image is located in the imaging region to be processed is determined according to the following conditions: if $F1(x,y)*F2(x,y)<=0$, the point $P(x,y)$ is in the imaging region to be processed; and if $F1(x,y)*F2(x,y)>0$, the point $P(x,y)$ is out of the imaging region to be processed.

The apparatus according to the present disclosure may further include a unit for computing in real time a set of rectangular coordinates of all of the points on the imaging region to be processed according to the formulae $F1(x,y)=0$ and $F2(x,y)=0$ of the boundaries in the depth direction of the imaging region to be processed in the rectangular coordinate system, where x and y are integers.

In one embodiment, the apparatus is provided with a lookup table to store a set of rectangular coordinates of all of the points on the imaging region to be processed, which are computed according to the formulae $F1(x,y)=0$ and $F2(x,y)=0$ of the boundaries in the depth direction of the imaging region to be processed in the rectangular coordinate system, where x and y are integers.

According to a fifth aspect of the present disclosure, there is provided an apparatus for quickly determining an imaging region in an ultrasonic imaging system including a unit for determining a range of a resultant image covered by a transmitted sound field based on energy lines of the transmitted sound field that have energy equal to a threshold; and an unit for determining in the depth direction in a point-by-point manner a rectangular coordinate pair of $P1(x,y)$ and $P2(x,y)$ of corresponding points at the same depth on respective boundaries by considering the energy lines of the transmitted sound field having energy equal to the threshold as boundaries in a depth direction of the imaging region to be processed, where the points with the sound field energy larger than the threshold are within the imaging region to be processed.

The apparatus according to the fifth aspect of the present disclosure may be further provided with a lookup table to store the rectangular coordinate pairs of P1(x,y) and P2(x,y) of corresponding points at the same depth on the respective boundaries.

The apparatus according to the present disclosure may further include a unit for determining a set of rectangular coordinates of all of the points on the imaging region to be processed, where x and y are integers after looking up from the lookup table the rectangular coordinate pairs of P1(x,y) and P2(x,y) of corresponding points at the same depth on the respective boundaries.

In various embodiments, the apparatus according to the present disclosure may be integrated into a beam formation module or a signal processing module.

In comparison with conventional DSC techniques, the disclosed method and apparatus are capable of determining the imaging region to be processed for each transmission in the rectangular coordinate system and the set of the rectangular coordinates of the points on the displayed image to be processed, based on characteristics of the current transmitted sound field and the particular imaging mode. Consequently, the updating of the resultant image is related to the current transmission. In addition, the method and apparatus as provided may be applied to various steps executed by the ultrasonic imaging system.

In an ultrasonic system, for each transmission, the sound field always covers a certain dimensional region. Hence, the disclosed method computes a set of rectangular coordinates of the points on an imaging region that need to be updated by associating the current transmission and the imaging mode.

Figure 3:
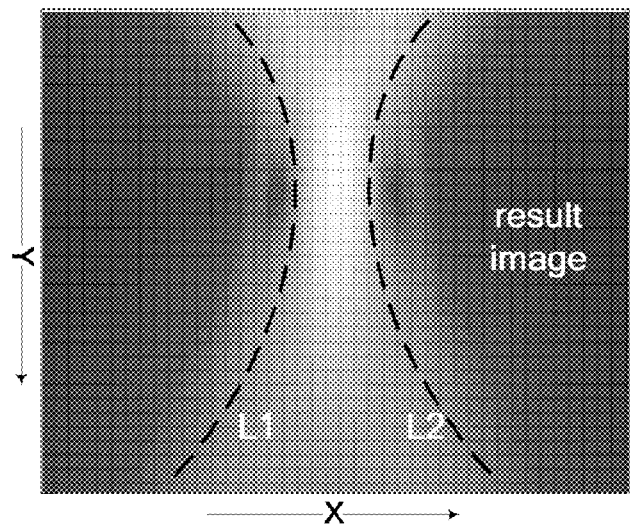
FIG. 3 is a diagram showing the energy distribution of a transmitted sound field.

FIG. 3 illustrates the energy distribution of the sound field for one transmission. A greater brightness suggests stronger energy and vice versa. The energy in the mid-region is stronger, while that at the sides is relatively weak. If a region has stronger energy, it signifies that the region is rich in ultrasonic echo information. A better signal-to-noise ratio may be obtained when applying data concerning this region to beam formation.

Figure 4:
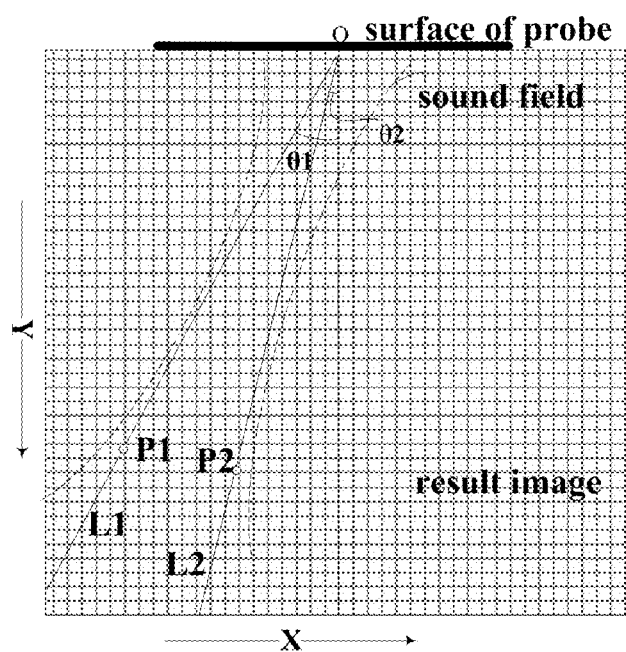
FIG. 4 is a diagram of the transmitting/receiving region of a phased array.

FIG. 4 illustrates the transmitting/receiving region of a phased-array probe. For each transmission, a sound wave is transmitted through a transmitting aperture composed of the array elements of the probe to form a sound beam. The sound field is delimited by dotted lines (i.e. isolines of the energy distribution of the transmitted sound field) covering a range of the imaging region. In the case of phased array imaging, the ultrasonic echo region defines a sector-shaped region. The resultant image is shown in the rectangular coordinate system as the rectangular region consisting of various grids shown in FIG. 4. The x axis of the rectangular coordinate system is in the direction parallel to the surface of the probe and the y axis in the direction of the depth. For the current transmission/reception, energy of the transmitted sound field always covers a region of the resultant image, so the echo data include data concerning this region of the resultant image. The region to be processed may therefore be determined according to the transmitted sound field and the demand of the imaging. As shown in FIG. 4, for phased-array imaging, the region defined by the two straight lines L1 and L2 starting from point O is the region to be processed. Assuming L1 forms an angle θ1 with respect to the direction of the y axis, and L2 forms an angle θ2 with respect to direction of the y axis. The polar coordinates may be converted to rectangular coordinates as follows:

$x=r*\sin(\theta)$ $y=r*\cos(\theta)$

Using these equations, point P1 (r1,θ1) on straight line L1 in the polar coordinate system may be converted to rectangular coordinates (x1,y1), one of the points that define the resultant image, and similarly, point P2 (r2,θ2) on the straight line L2 may be converted to rectangular coordinates (x2,y2), another point that forms the resultant image. Consequently, given the point P1 and the angle θ1, it is possible to determine formula F1(x,y)=0 of L1 in the rectangular coordinate system. Likewise, given the point P2 and the angle θ2, it is possible to determine formula F2(x,y)=0 of L2 in the rectangular coordinate system. It is known from basic linear algebra that if a point P(x,y) on the resultant image is located in the region between lines L1 and L2, then F1(x, y)*F2(x,y)<=0; and if the point P is not located in the region between lines L1 and L2, then F1(x,y)*F2(x,y)>0. Thus, the region to be processed for the current transmission may be determined in the rectangular coordinate system.

Figure 5:
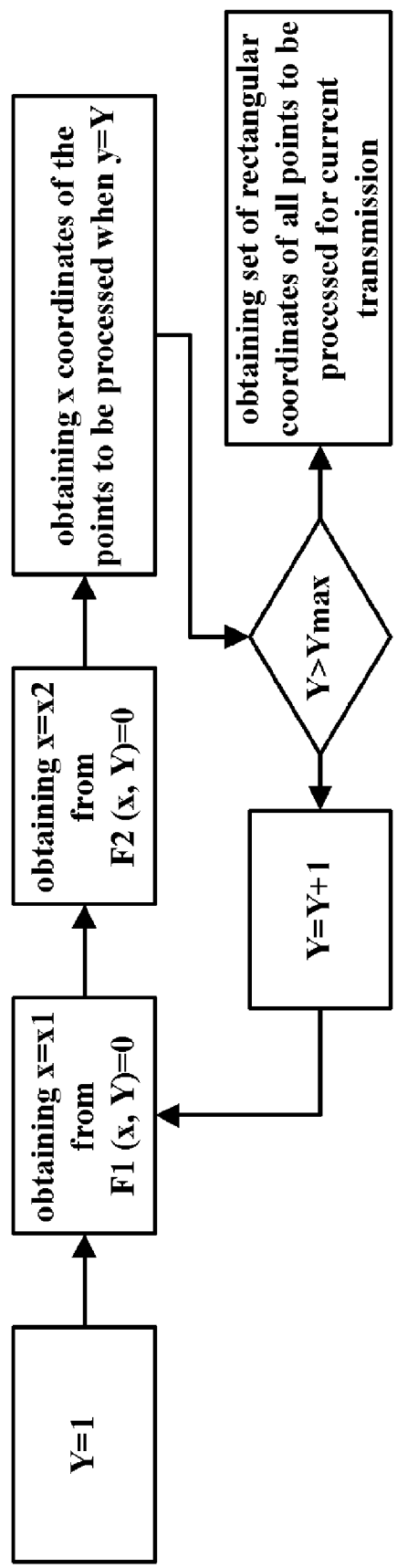
FIG. 5 shows a process for computing rectangular coordinates of points to be processed on a displayed image.

In the case where the x coordinate and the y coordinate of a point on the displayed image are both integers, once the formulae of the boundaries defining the region to be processed are obtained, the set of the rectangular coordinates of points on the displayed image in the region may be obtained using various methods. FIG. 5 shows one of the methods for computing rectangular coordinates of points on the displayed image to be processed. Assuming the width pixel point of the displayed image is Ymax, the algorithm starts from Y=1, . . . , until Y=Ymax. For each Y, it is possible to derive x=x1 and x=x2 from the formula F1(x,y)=0 and F2(x,y)=0. Thus, the integers between x1 and x2 are the x coordinates of the points to be processed. After each Y is involved in the algorithm, the set of the rectangular coordinates of the points on the displayed images to be processed for the current transmission may be obtained. Similarly, the same processes may be applied to the x coordinates to obtain the set of the rectangular coordinates of the points on the image region to be processed for the current transmission.

Figure 6:
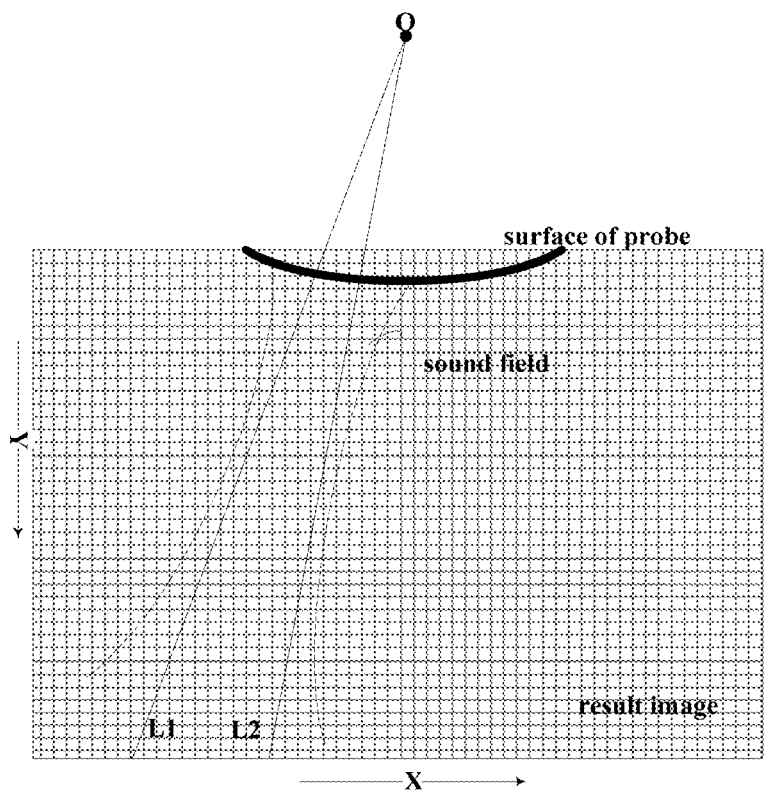
FIG. 6 is a diagram of the transmitting/receiving region of a convex array.
Figure 7:
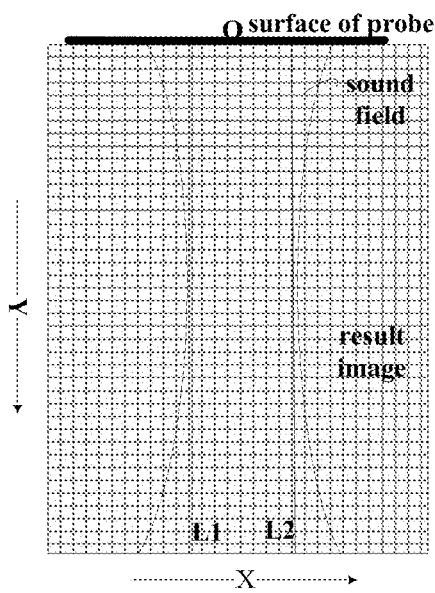
FIG. 7 is a diagram of the transmitting/receiving region of a linear array.

Likewise, in view of the imaging mode, the convex array shown in FIG. 6 and the linear array shown in FIG. 7 may employ a similar method to obtain the set of the rectangular coordinates of the points on the imaging region to be processed for the current transmission.

As mentioned above, the regions to be processed for each transmission is located between the two straight lines, i.e. the imaging region for each transmission is sector-shaped (a rectangular shape in the case of a linear array). However, the present disclosure is not limited to the imaging region having these shapes. For example, since the shape of the sound field is such that it is narrow in the focusing region but wide in the near and far fields and since the received ultrasonic echo information for each transmission includes the data representing these regions, the imaging region corresponding to the current transmission may also be correspondingly shaped. The boundaries of the imaging region are not necessarily straight lines, but randomly shaped. In particular, the region to be processed may be shaped according to the energy distribution of the transmitted sound field.

FIG. 3 is a diagram showing the energy distribution of the transmitted sound field, where curves L1 and L2 are the energy isolines of the transmitted sound field. The sound field of the present disclosure is obtained through emulation. The region to be processed may be determined based on, for example, normalized energy. The energy at each depth position (i.e. the y axis represents the depth direction) is involved in the normalizing algorithm, and a certain normalized energy is used as a threshold (such as, for example, −20 dB). A region composed of the portions where the normalized energies are larger than the threshold may be obtained, and that region is between the curves L1 and L2 shown in FIG. 3. Boundaries L1 and L2 along the depth are computable.

Figure 8:
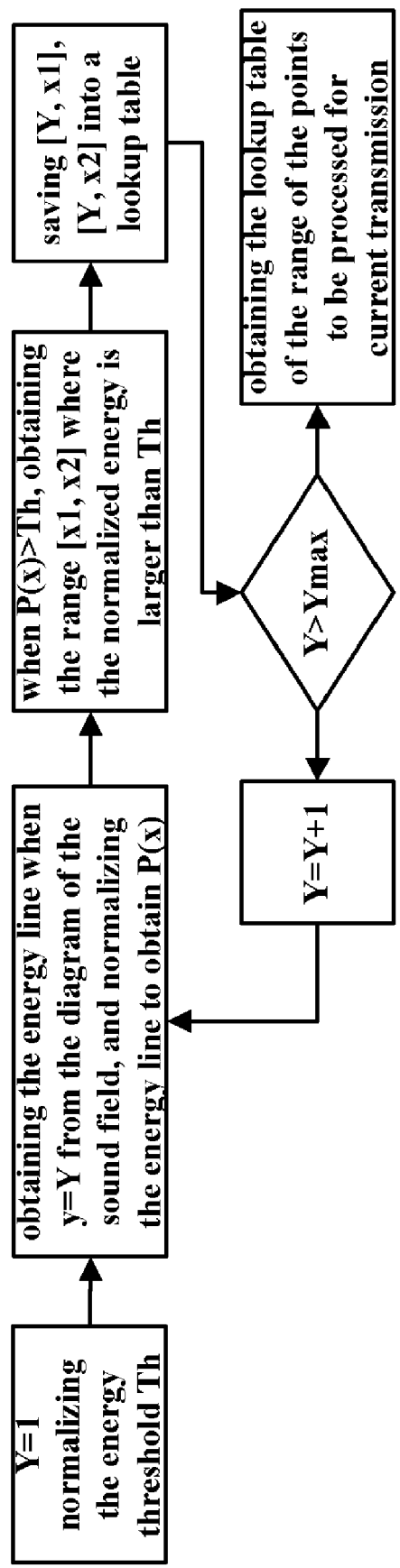
FIG. 8 is a flowchart of a method for constructing a lookup table for determining an imaging region in an ultrasonic system.

Since the emulation of the sound field is often time-consuming, the method of the present disclosure uses a lookup table to save the set of rectangular coordinates of the points in the region to be processed for each transmission, and thereby the rectangular coordinates of the points to be processed for each transmission can be determined. The construction of the lookup table is shown in FIG. 8. For each of the points Y on the y axis in the rectangular coordinate system, the respective energy line of the sound field at the corresponding depth can be obtained from the diagram of energy distribution of the sound field. Assuming P (x) is obtained upon normalizing the energy line, x coordinate range [x1,x2] where the normalized energy is larger than the threshold Th can be obtained based on the normalized energy line P(x). Based on the saved rectangular coordinates [Y,x1] and [Y,x2], the rectangular coordinates of the points to be processed at the same depth may be determined. In fact, x1s at all depths construct the boundary L1 in FIG. 3 and x2s at all depths construct the boundary L2 in FIG. 3.

Figure 9:
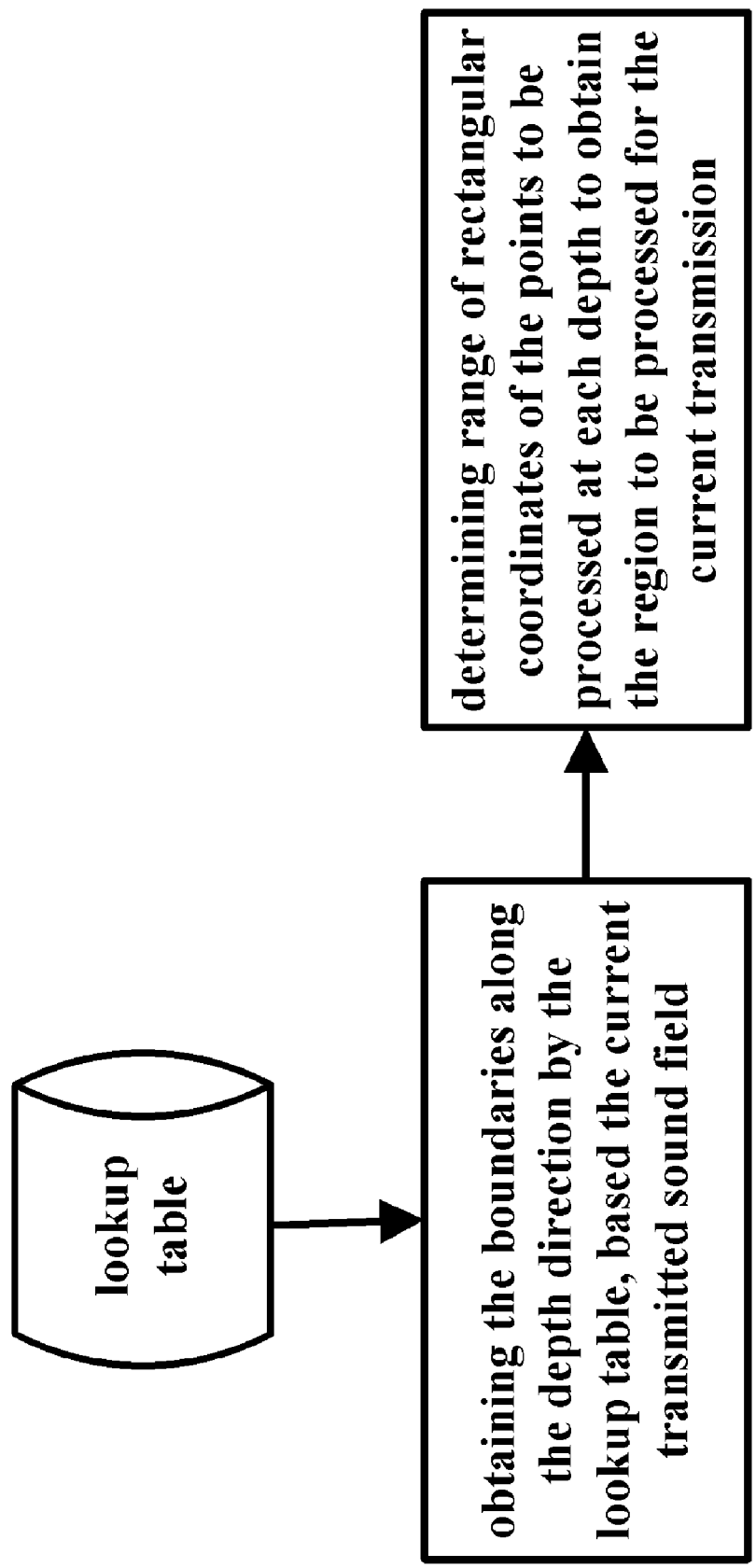
FIG. 9 is a flowchart of a method for determining the imaging region to be processed related to the transmission based on the lookup table of FIG. 8.

FIG. 9 shows a flowchart of computing the set of the rectangular coordinates of the points in the region to be processed for each transmission. [Y,x1] and [Y,x2] are obtained from the lookup table, and when y=Y, the points to be processed are the collection of integral points between [x1,x2]. Thereby, the region to be processed for the current transmission may be determined in the rectangular coordinate system.

Figure 10:
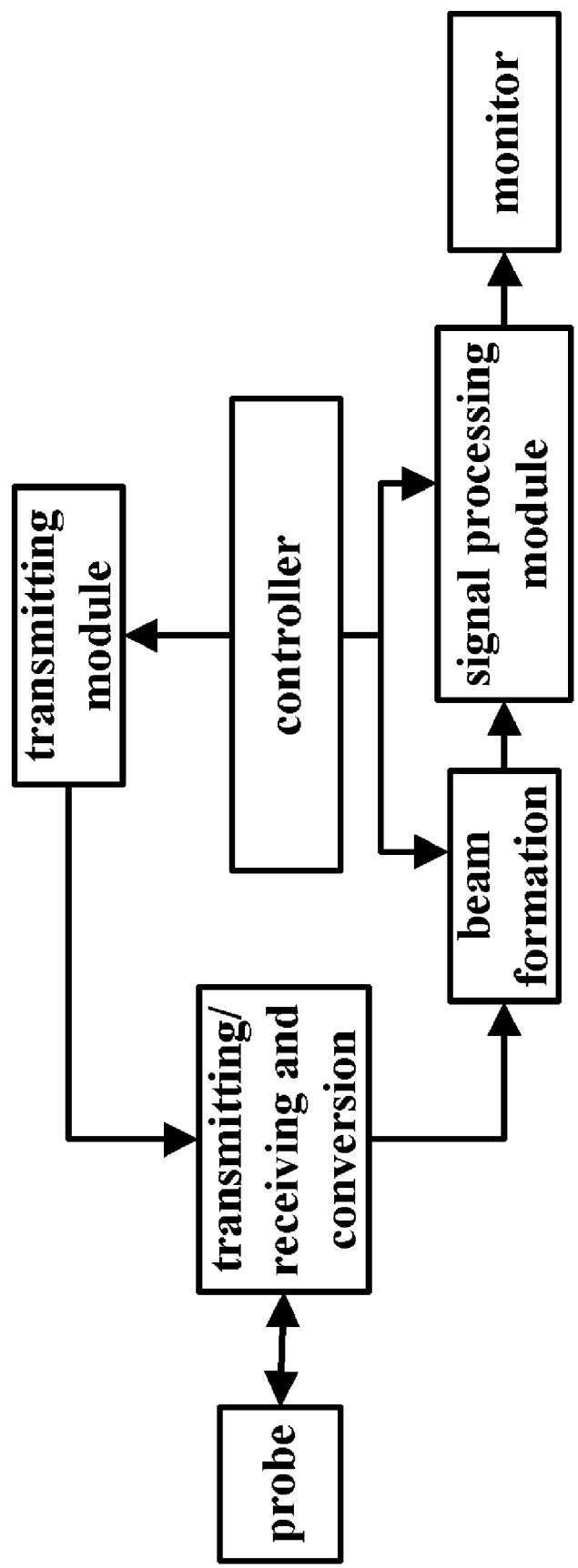
FIG. 10 is a schematic diagram of an ultrasonic system according to the present disclosure.

FIG. 10 shows an ultrasonic system of the present disclosure, in which the front end is a probe connected to the transmitting/receiving and conversion part. When the system is in the transmitting state, a controller of the system controls a transmitting module to excite the probe to transmit a beam into the object to be detected. When the system is in the receiving state, echo data reflected by the object are received over multiple channels and are subjected to beam formation. The data upon beam formation are processed by a signal processing module, which may comprise a B data processing sub-module, a C data processing sub-module, a D data processing sub-module, etc. The processed signals are then used to update the resultant image for displaying. The controller controls the beam formation and the signal processing module according to the demand of the imaging and, meanwhile, enters the set of rectangular coordinates of the points on the imaging region to be processed for the current transmission into the corresponding modules for processing. The information related to each transmission may be saved in the lookup table or computed in real time.

The above method for quickly determining the imaging region is applicable to various parts of the ultrasonic system, including the beam formation module or the signal processing module.

Detailed descriptions of several example embodiments are provided above. However, the invention is not restricted to these example embodiments. Without departing from the scope of the invention, those skilled in this art may make changes and modifications, which will all fall into the claims of the invention.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Embodiments may also be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

What is claimed is:

1. A method for determining an imaging region in an ultrasonic imaging system, comprising:
    transmitting ultrasound energy into an insonified region in a current scan plane, thereby forming a transmitted sound field, and receiving ultrasound echo return signals from the insonified region;
    determining a range of a resultant image covered by the transmitted sound field based on energy lines of the transmitted sound field that have energy equal to a threshold;
    determining boundaries in a depth direction of the imaging region to be processed within said range according to characteristics of an imaging mode, said boundaries being determined as a function of the threshold and intensity values of echo signals from insonified points in the current scan plane, said boundaries thereby being variable according to each current scan plane;
    geometrically converting for display and displaying a representation of the intensity values originating only between the boundaries; and determining formulae F1(x, y)=0 and F2(x, y)=0 of the boundaries in a rectangular coordinate system according to angles of the boundaries with respect to the depth direction and polar coordinates of random points on the boundaries, wherein x=r*sin(θ) and y=r*cos(θ), wherein, whether a point P(x, y) on the resultant image is located in the imaging region to be processed is determined according to the following conditions: if F1(x, y)*F2(x, y)<=0, the point P(x, y) is in the imaging region to be processed; and if F1(x, y)*F2(x, y)>0, the point P(x, y) is out of the imaging region to be processed.

2. The method according to claim 1, further comprising: computing in real time a set of rectangular coordinates of all of the points on the imaging region to be processed according to the formulae F1(x, y)=0 and F2(x, y)=0 of the boundaries in the depth direction of the imaging region to be processed in the rectangular coordinate system, wherein x and y are integers.

3. The method according to claim 1, further comprising: configuring a lookup table to store a set of rectangular coordinates of all of the points on the imaging region to be processed, which are computed according to the formulae F1(x, y)=0 and F2(x, y)=0 of the boundaries in the depth direction of the imaging region to be processed in the rectangular coordinate system, wherein x and y are integers.

4. The method according to claim 1, wherein the imaging region to be processed is sector-shaped.

5. The method according to claim 1, wherein the imaging region to be processed is rectangular.

6. An apparatus for determining an imaging region in an ultrasonic imaging system, comprising:
a unit for transmitting ultrasound energy into an insonified region in a current scan plane, thereby forming a transmitted sound field, and receiving ultrasound echo return signals from the insonified region;
a unit for determining a range of a resultant image covered by the transmitted sound field based on energy lines of the transmitted sound field that have energy equal to a threshold;
a unit for determining boundaries in a depth direction of the imaging region to be processed within said range according to characteristics of an imaging mode, said boundaries being determined as a function of the threshold and intensity values of echo signals from insonified points in the current scan plane, said boundaries thereby being variable according to each current scan plane, wherein the unit for determining boundaries comprises:
a unit for determining formulae F1(x, y)=0 and F2(x, y)=0 of the boundaries in a rectangular coordinate system according to angles of the boundaries with respect to the depth direction and polar coordinates of random points on the boundaries, wherein x=r*sin(θ) and y=r*cos(θ), wherein, whether a point P(x, y) on the resultant image is located in the imaging region to be processed is determined according to the following conditions:
if F1(x, y)*F2(x, y)<=0, the point P(x, y) is in the imaging region to be processed;
and if F1(x, y)*F2(x, y)>0, the point P(x, y) is out of the imaging region to be processed; and
a unit for geometrically converting for display and displaying a representation of the intensity values originating only between the boundaries.

7. The apparatus according to claim 6, further comprising:
a unit for computing in real time set of rectangular coordinates of all of the points on the imaging region to be processed according to the formulae F1(x, y)=0 and F2(x, y)=0 of the boundaries in the depth direction of the imaging region to be processed in the rectangular coordinate system, wherein x and y are integers.

8. The apparatus according to claim 6, wherein a lookup table is provided in the apparatus, the lookup table being used to store set of rectangular coordinates of all of the points on the imaging region to be processed, which are computed according to the formulae F1(x, y)=0 and F2(x, y)=0 of the boundaries in the depth direction of the imaging region to be processed in the rectangular coordinate system, wherein x and y are integers.

9. The apparatus according to claim 6, wherein the imaging region to be processed is sector-shaped.

10. The apparatus according to claim 6, wherein the imaging region to be processed is rectangular.

11. The apparatus according to claim 6, wherein the apparatus is integrated into a beam formation module.

12. The apparatus according to claim 6, wherein the apparatus is integrated into a signal processing module.

13. An apparatus for determining an imaging region in an ultrasonic imaging system, comprising:
means for determining a range of a resultant image covered by a transmitted sound field based on energy lines of the transmitted sound field that have energy equal to a threshold;
means for determining boundaries in a depth direction of the imaging region to be processed within said range according to characteristics of an imaging mode; and
means for determining formulae F1(x, y)=0 and F2(x, y)=0 of the boundaries in a rectangular coordinate system according to angles of the boundaries with respect to the depth direction and polar coordinates of random points on the boundaries, wherein x=r*sin(θ) and y=r*cos(θ);
wherein, whether a point P(x, y) on the resultant image is located in the imaging region to be processed is determined according to the following conditions: if F1(x, y)*F2(x, y)<=0, the point P(x, y) is in the imaging region to be processed; and if F1(x, y)*F2(x, y)>0, the point P(x, y) is out of the imaging region to be processed.

* * * * *